(12) United States Patent
Patel et al.

(10) Patent No.: US 12,405,917 B2
(45) Date of Patent: Sep. 2, 2025

(54) CHASSIS SUPPORTING INTERCHANGEABLE ACCELERATOR BASEBOARDS

(71) Applicant: Dell Products, L.P., Round Rock, TX (US)

(72) Inventors: Bhavesh Govindbhai Patel, Austin, TX (US); Daniel Alvarado, Pflugerville, TX (US)

(73) Assignee: Dell Products, L.P., Round Rock, TX (US)

( * ) Notice: Subject to any disclaimer, the term of this patent is extended or adjusted under 35 U.S.C. 154(b) by 492 days.

(21) Appl. No.: 17/815,464

(22) Filed: Jul. 27, 2022

(65) Prior Publication Data

US 2024/0037062 A1 Feb. 1, 2024

(51) Int. Cl.
*H05K 7/20* (2006.01)
*G06F 1/20* (2006.01)
*G06F 15/80* (2006.01)

(52) U.S. Cl.
CPC .............. *G06F 15/80* (2013.01); *G06F 1/206* (2013.01)

(58) Field of Classification Search
CPC .......... H05K 5/0256; H05K 5/06; H05K 7/14; H05K 7/1407; H05K 7/1417; H05K 7/1431; H05K 7/1461; H05K 7/1465; H05K 7/1474; H05K 7/1488
See application file for complete search history.

(56) References Cited

U.S. PATENT DOCUMENTS

| | | | |
|---|---|---|---|
| 2005/0106936 A1* | 5/2005 | Chen ................... | H05K 7/1417 439/547 |
| 2006/0169719 A1* | 8/2006 | Bui ....................... | G01N 1/312 222/325 |
| 2014/0071616 A1* | 3/2014 | Watanabe ............ | H05K 7/20772 361/679.47 |
| 2014/0251583 A1* | 9/2014 | Eriksen ............... | H05K 7/20772 165/104.33 |
| 2015/0181748 A1* | 6/2015 | Bailey ................. | G11B 33/128 361/679.02 |
| 2017/0018293 A1* | 1/2017 | Chen .................... | G06F 1/187 |
| 2017/0181329 A1* | 6/2017 | Shelnutt .............. | H05K 7/20781 |
| 2017/0290190 A1* | 10/2017 | Lindquist ............ | H05K 13/00 |

(Continued)

*Primary Examiner* — Anthony Q Edwards
(74) *Attorney, Agent, or Firm* — Fogarty LLP

(57) ABSTRACT

Systems provide a chassis that support interchangeable hardware accelerator baseboards. The geometry of a first accelerator baseboard tray corresponds to the geometry of a first accelerator baseboard. The geometry of a second accelerator baseboard tray corresponds to the geometry of a second accelerator baseboard. A chassis incudes an accelerator baseboard compartment that includes a plurality of structures mounted on its base, where these structures receive corresponding structures of the first tray and that also receive corresponding structures of the second tray. Installation of the first tray on the structures mounted on the base of the compartment and installation of the first accelerator baseboard on the first tray aligns the first accelerator baseboard within the compartment. Installation of the second tray on the structures mounted on the base of the compartment and installation of the second accelerator baseboard on the second tray aligns the second accelerator baseboard within the compartment.

15 Claims, 8 Drawing Sheets

(56) References Cited

U.S. PATENT DOCUMENTS

| | | | |
|---|---|---|---|
| 2018/0279510 A1* | 9/2018 | Johnson | H05K 7/20772 |
| 2019/0171258 A1* | 6/2019 | Rice | F28D 15/0275 |
| 2021/0216121 A1* | 7/2021 | Weldon | G06F 1/203 |
| 2021/0298202 A1* | 9/2021 | Shao | H05K 7/20272 |
| 2021/0385970 A1* | 12/2021 | Su | G01M 3/3263 |
| 2022/0015270 A1* | 1/2022 | Miyamura | F16M 13/02 |
| 2024/0049425 A1* | 2/2024 | Chen | G01M 3/16 |

\* cited by examiner

CHASSIS SUPPORTING INTERCHANGEABLE ACCELERATOR BASEBOARDS

FIELD

The present disclosure relates generally to Information Handling Systems (IHSs), and relates more particularly to supporting interchangeable computing components in a chassis housing one or more IHSs.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Groups of IHSs may be housed within data center environments. A data center may include a large number of IHSs, such as servers, that are installed within chassis and stacked within slots provided by racks. A data center may include large numbers of such racks that may be organized into rows in a manner that allows administrators to access components of the IHSs via the front and the back of a rack. In some instances, administrators may be able to service and replace components of a rack-mounted IHS while the IHS remains operational and installed within the rack. Such replaceable components may be referred to as being hot-pluggable. An administrator may also be able to re-configure aspects of the operation of a rack-mounted IHS through the coupling and de-coupling of cables to the various connectors that may be provided on the back of a chassis or by a rear-facing chassis component. In some instances, administrators may remove an IHS from operation in order to service or replace some of its internal components. In all such cases, it is preferable that administrators be able to access and service an IHS as easily, safely, and quickly as possible within the constraints of a server IHS being installed within a rack of a densely packed data center.

In many instances, rack systems are constructed according to standardized dimensions that define vertical and horizontal dimensions for components, such as chassis housing one or more server IHSs, that are installed within such racks. Standardized rack dimensions specify vertical units of space within a rack, where such vertical units of rack space are commonly referred to as RUs (Rack Units). In some instances, a chassis may be one rack unit (1 RU) in height and may house a single IHS. In other instances, a chassis be multiple rack units in height and the chassis may include multiple IHSs. For example, a 2 RU chassis may include a set of front bays that receive replaceable storage drives and may house two layers of components that are each 1 RU in height.

SUMMARY

In various embodiments, systems may include: a first accelerator baseboard comprising a plurality of processing cores; a first baseboard tray of a geometry corresponding to a geometry of the first accelerator baseboard; a second accelerator baseboard comprising a plurality of processing cores; a second baseboard tray of a geometry corresponding to a geometry of the second accelerator baseboard; a 2 RU chassis comprising a 1 RU accelerator baseboard compartment, wherein a base of the accelerator baseboard compartment comprises a plurality of structures mounted on the base that receive corresponding structures of the first baseboard tray and that also receive corresponding structures of the second baseboard tray; and wherein installation of the first baseboard tray on the structures mounted on the base of the accelerator baseboard compartment and installation of the first accelerator baseboard on the first baseboard tray aligns the first accelerator baseboard within the accelerator baseboard compartment; and wherein installation of the second baseboard tray on the structures mounted on the base of the accelerator baseboard compartment and installation of the second accelerator baseboard on the second baseboard tray aligns the second accelerator baseboard within the accelerator baseboard compartment.

In some system embodiments, the first accelerator baseboard and the second accelerator baseboard each comprise at least one of a plurality of GPUs (Graphics Processing Units) and a plurality of DPUs (Data Processing Units). In some system embodiments, wherein the installation of the first baseboard tray on the structures mounted on the base of the accelerator baseboard compartment further aligns the first accelerator baseboard with a first liquid cooling manifold installed in the accelerator baseboard compartment, and wherein installation of the second baseboard tray on the structures mounted on the base of the accelerator baseboard compartment further aligns the second accelerator baseboard with a second liquid cooling manifold installed in the accelerator baseboard compartment. In some system embodiments, the geometry of the first baseboard tray further corresponds to an installed location of the first liquid cooling manifold in the accelerator baseboard compartment, and wherein the geometry of the second baseboard tray further corresponds to an installed location of the second liquid cooling manifold in the accelerator baseboard compartment. In some system embodiments, the plurality of structures mounted on the base of the accelerator baseboard compartment comprises a plurality of keyhole standoffs mounted at locations dispersed about the base of the accelerator baseboard compartment. In some system embodiments, each of the plurality of keyhole standoffs mounted on base of the accelerator baseboard compartment comprise a recessed portion, and wherein the structures of the first baseboard tray and the structures of the second baseboard tray comprise keyhole cutouts that are received by the recessed portion of respective keyhole standoffs. In some system embodiments, each of the plurality of keyhole standoffs comprises a head portion above the recessed portion and a base portion below the recessed portion, wherein the height of the base portion elevates the installed first baseboard tray and the installed second baseboard tray above the base of the accelerator baseboard compartment. In some system embodiments, the width of the grooved portion of the pins corresponds to the thickness of sheet metal used to construct the first baseboard tray and the second baseboard tray. In some system embodiments, the plurality of structures mounted on the base of the accelerator baseboard compartment are disbursed in a first pattern, and wherein the structures of the first baseboard tray and the structures of the second baseboard tray are also arranged in the first pattern. In some system embodiments, the first pattern is a grid pattern. In some system embodiments, installation of the first baseboard tray on the structures mounted on the base of the accelerator baseboard compartment further aligns holes of the first baseboard tray with threaded holes in the base of the accelerator baseboard compartment, and wherein installation of the second baseboard tray on the structures mounted on the base of the accelerator baseboard compartment further aligns holes of the second baseboard tray with the threaded holes in the base of the accelerator baseboard compartment. In some system embodiments, the aligned holes of the first baseboard tray and the threaded holes in the base of the accelerator baseboard compartment receive screws used to fasten the first baseboard tray to the base and to precisely position the first baseboard tray relative to a liquid cooling manifold, and wherein the aligned holes of the second baseboard tray and the threaded holes in the base of the accelerator baseboard compartment receive screws used to fasten the second baseboard tray to the base and to precisely position the second baseboard tray relative to the liquid cooling manifold. In some system embodiments, the first baseboard tray and the second baseboard tray are installed horizontally within the 1 RU accelerator baseboard compartment. In some system embodiments, a plurality of first standoffs of a first height are mounted on the first baseboard tray and the first accelerator baseboard is fastened to the first standoffs in installing the first accelerator baseboard to the first baseboard tray, and wherein a plurality of second standoffs of a second height are mounted on the second baseboard tray and the second accelerator baseboard is fastened to the second standoffs in installing the second accelerator baseboard to the second baseboard tray. In some system embodiments, the first height of the first standoffs is selected to accommodate features on an underside of the first accelerator baseboard when fastened to the first standoffs.

In various additional embodiments, a 2 RU chassis housing one or more Information Handling Systems (IHSs) may include: a 1 RU control layer, comprising: a motherboard installed at a rear of the control layer; a bank of cooling fans installed in a central compartment of the control layer, wherein the cooling fans provide airflow cooling to the motherboard and to a power supply located at a rear of a processing layer of the chassis; and the 1 RU processing layer, comprising: the power supply for use by components installed in the control layer of the chassis and for use by components installed in a processing layer of the chassis; an accelerator baseboard compartment located at a front of the processing layer, wherein a base of the accelerator baseboard compartment comprises a plurality of structures mounted on the base that receive corresponding structures of a first baseboard tray of a first geometry and that also receive corresponding structures of a second baseboard tray of a second geometry; wherein installation of the first baseboard tray on the structures mounted on the base of the accelerator baseboard compartment and installation of a first accelerator baseboard on the first baseboard tray aligns the first accelerator baseboard within the accelerator baseboard compartment; and wherein installation of the second baseboard tray on the structures mounted on the base of the accelerator baseboard compartment and installation of a second accelerator baseboard on the second baseboard tray aligns a second accelerator baseboard within the accelerator baseboard compartment.

In some chassis embodiments, the first accelerator baseboard and the second accelerator baseboard each comprise at least one of a plurality of GPUs (Graphics Processing Units) and a plurality of DPUs (Data Processing Units). In some chassis embodiments, the installation of the first baseboard tray on the structures mounted on the base of the accelerator baseboard compartment further aligns the first accelerator baseboard with a first liquid cooling manifold installed in the accelerator baseboard compartment, and wherein installation of the second baseboard tray on the structures mounted on the base of the accelerator baseboard compartment further aligns the second accelerator baseboard with a second liquid cooling manifold installed in the accelerator baseboard compartment.

In various additional embodiments, Information Handling Systems (IHSs) housed within a 2 RU (Rack Unit) chassis may include: a motherboard installed at a rear side of a 1 RU control layer of the chassis, wherein the motherboard comprises one or more CPUs (Central Processing Units); a bank of cooling fans installed in a central compartment of the 1 RU control layer, wherein the cooling fans provide airflow cooling to the motherboard and to a power supply located at a rear of a processing layer of the chassis; a power supply installed within a 1 RU processing layer of the chassis and supplying power for use by components installed in the control layer of the chassis and for use by components installed in the processing layer of the chassis; a first accelerator baseboard comprising a plurality of processing cores; a first baseboard tray of a geometry corresponding to a geometry of the first accelerator baseboard, wherein installation of the first baseboard tray on the structures mounted on a base of an accelerator baseboard compartment of the chassis and installation of the first accelerator baseboard on the first baseboard tray aligns the first accelerator baseboard within the accelerator baseboard compartment; a second accelerator baseboard comprising a plurality of processing cores; and a second baseboard tray of a geometry corresponding to a geometry of the second accelerator baseboard, wherein installation of the second baseboard tray on the structures mounted on the base of the accelerator baseboard compartment of the chassis and installation of the second accelerator baseboard on the second baseboard tray aligns the second accelerator baseboard within the accelerator baseboard compartment.

In some IHS embodiments, the first accelerator baseboard and the second accelerator baseboard each comprise at least one of a plurality of GPUs (Graphics Processing Units) and a plurality of DPUs (Data Processing Units).

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

As described, in a data center environment, an IHS may be installed within a chassis, in some cases along with other similar IHSs, such as other server IHSs. A rack may house multiple such chassis and a data center may house numerous racks. Each rack may host a relatively large number of IHSs that are installed as components of chassis, with multiple chassis stacked and installed within each rack. In certain instances, the front-side of such rack-mounted chassis may include one or more bays that each receive an individual replaceable component, such as a storage drive or a computing node. In some instances, these components may be removeable components that may be inserted and extracted from rear-facing bays of the chassis. In some cases, these components may be hot-swappable components that may be removed and replaced by administrators while at least a portion of the IHS remains operational. Some rack-mounted chassis may be multiple rack units in height and may house multiple IHSs. For example, an IHS may be housed within a 2 RU (2 Rack Units) chassis that houses two layers of 1 RU components.

In such data center environments, reducing the vertical height of a chassis can significantly impact the density of components that can be supported within a rack, and thus throughout the data center. For instance, existing systems support chassis configurations that include multiple replaceable hardware accelerators for use in high-performance computing applications, but cooling requirements for such existing configurations that install the hardware accelerator baseboards vertically results in these chassis requiring at least 6 RUs, and sometimes up to 8 RUs, of space with a rack. Embodiments provide high-density chassis that provide support for interchangeable hardware accelerator baseboards, where the chassis fits within a 2 RU space.

Figure 1:
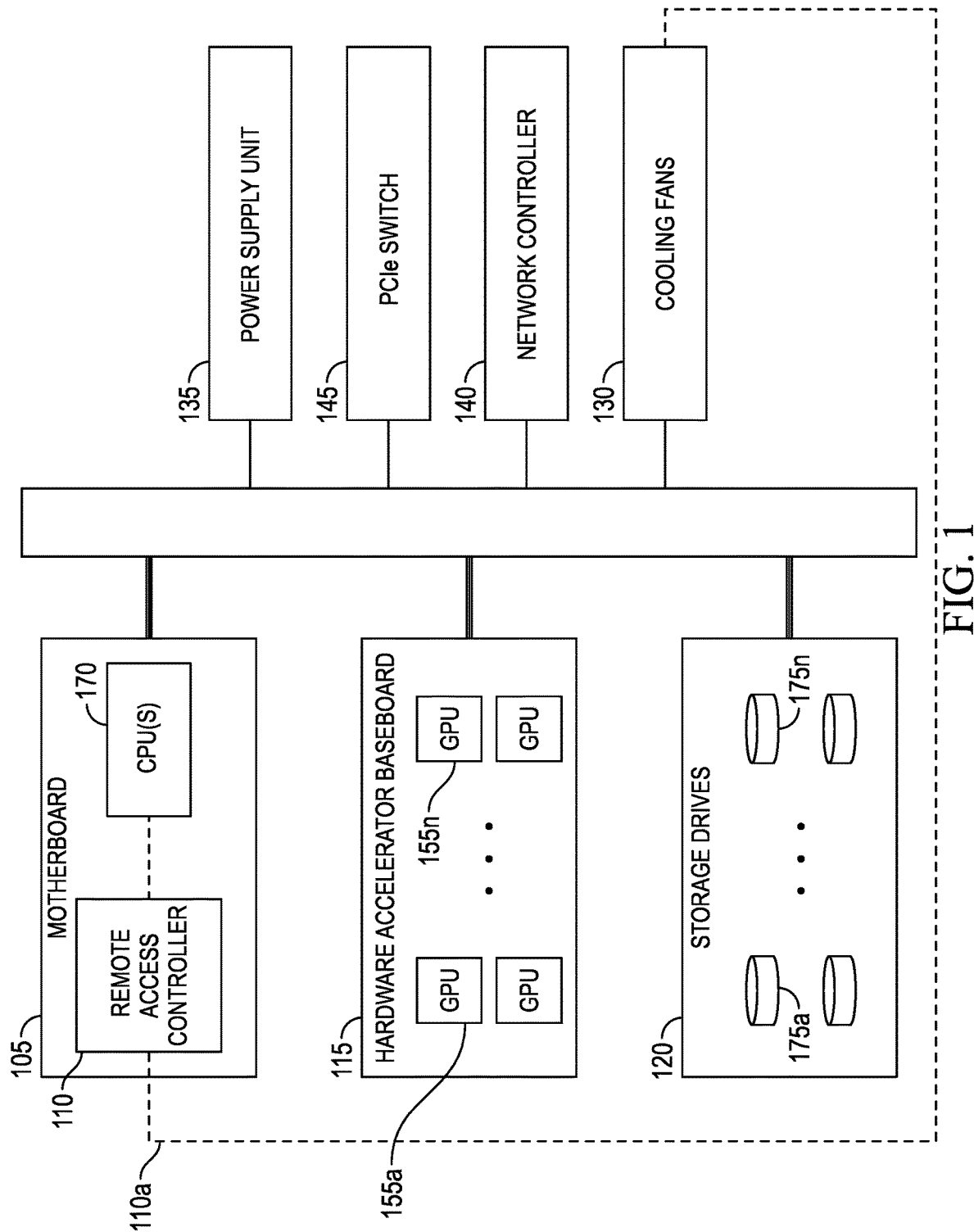
FIG. 1 is a diagram illustrating certain electrical components of a chassis configured, according to some embodiments, for supporting interchangeable accelerator baseboards.

FIG. 1 is a block diagram illustrating certain components of a chassis 100 that supports interchangeable hardware accelerator baseboards within the chassis 100. Embodiments of chassis 100 may include a wide variety of hardware configurations. Such variations in hardware configuration may result from chassis 100 being factory assembled to include components specified by a customer that has contracted for manufacture and delivery of chassis 100. Upon delivery and deployment of a chassis 100, the chassis 100 may be modified by replacing and/or adding various hardware components, in addition to replacement of the removeable IHSs components installed in the chassis.

Chassis 100 may include one or more bays that each receive an individual sled (that may be additionally or alternatively referred to as a tray, blade, and/or node) or board, such as a motherboard 105 and a hardware accelerator baseboard 115. Chassis 100 may support a variety of different numbers (e.g., 4, 8, 16, 32), sizes (e.g., single-width, double-width) and physical configurations of bays. Embodiments may include additional types of sleds that provide various storage, power and/or processing capabilities. For instance, sleds installable in chassis 100 may be dedicated to providing power management or networking functions. Sleds may be individually installed and removed from the chassis 100, thus allowing the computing and storage capabilities of a chassis to be reconfigured by swapping the sleds with different types of sleds, in some cases at runtime without disrupting the ongoing operations of the other sleds installed in the chassis 100. The sleds may be individually coupled to chassis 100 via connectors that correspond to the bays provided by the chassis 100 and that physically and electrically couple the sleds to motherboard 105 and/or to one another.

Multiple chassis 100 may be housed within a rack. Data centers may utilize large numbers of racks, with various different types of chassis installed in various configurations of racks. The modular architecture provided by the sleds, chassis and racks allow for certain resources, such as cooling, power and network bandwidth, to be shared by the sleds installed in chassis 100, thus providing efficiency improvements and supporting greater computational loads.

Chassis 100 may be installed within a rack structure that provides a portion of the cooling utilized by the sleds installed in chassis 100. For airflow cooling, a rack may include one or more banks of cooling fans that may be operated to ventilate heated air from within the chassis 100 that is housed within the rack. Chassis 100 may alternatively or additionally include a bank of cooling fans 130 that may be similarly operated to ventilate heated air out of the chassis and away from the sleds installed within chassis. In this manner, a rack and a chassis 100 installed within the rack may utilize various configurations and combinations of cooling fans to cool the sleds and other components housed within chassis 100.

As described in additional detail below, motherboard 105 may be implemented in embodiments such that it may be installed within a 1 RU bay of chassis 100, thus supporting a high-density configuration of a 2 U chassis 100 that supports use of interchangeable hardware accelerator baseboards 115. Motherboard 105 may include be a printed circuit board that includes electrical traces and connectors that are configured to route signals between the various components of chassis 100 that are connected to the motherboard 105 and between different components mounted on the motherboard. As illustrated, motherboard 105 may include one or more CPU(s) used to execute software programs that include an operating system and that may also include various programs for utilizing and managing the capabilities provided by chassis 100, and in particular capabilities provided by hardware accelerator baseboard 115.

Figure 2:
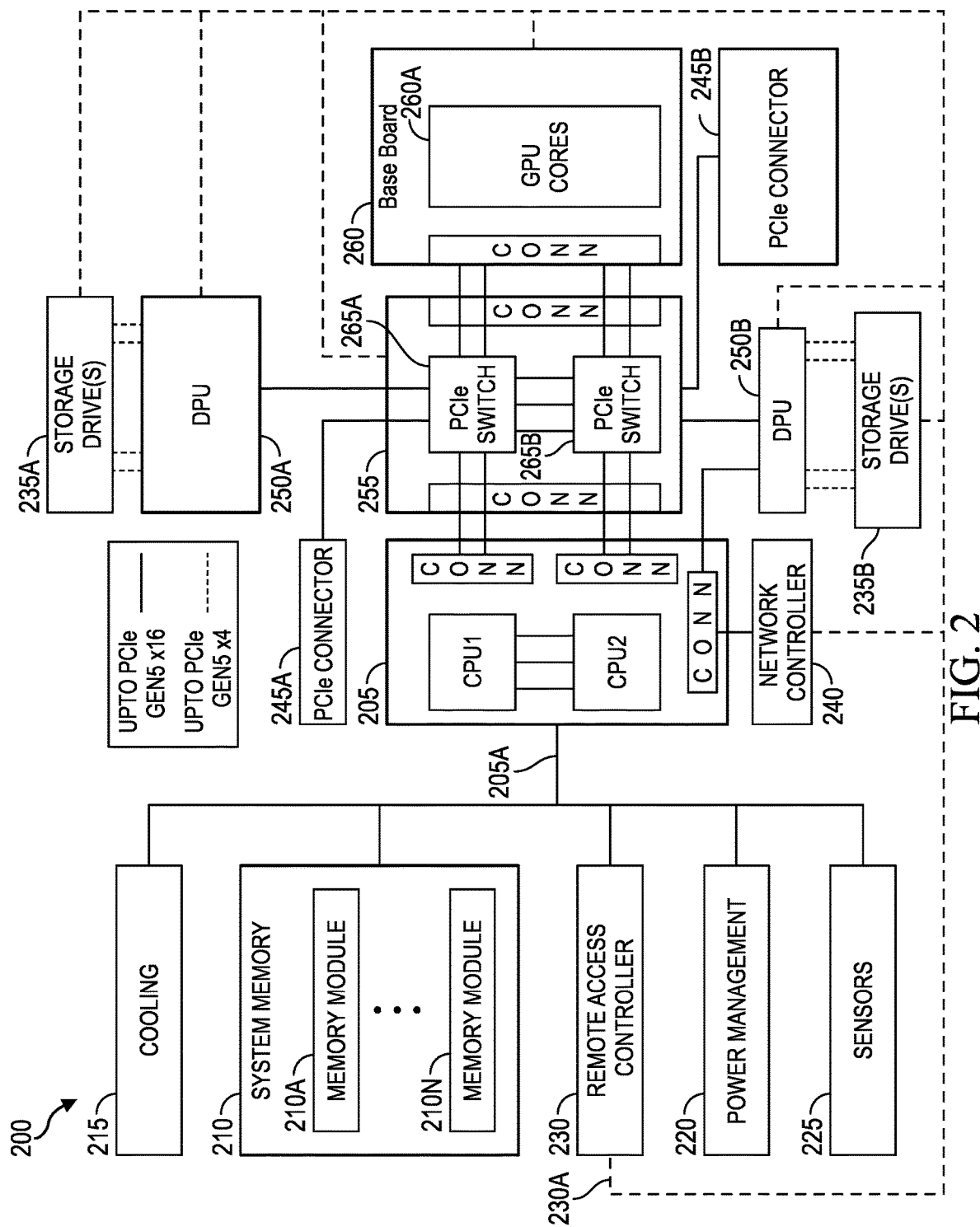
FIG. 2 is a diagram illustrating certain components of an IHS configured for installation in a chassis, according to some embodiments, that supports interchangeable accelerator baseboards.

In some embodiments, motherboard 105 may be an IHS such as described with regard to IHS 200 of FIG. 2. Accordingly, motherboard 105 may include a variety of processing and data storage components, including various system memories. Motherboard 105 may be coupled to components of chassis 100 via a PCIe switch fabric. In some embodiment, the connectors for use in coupling motherboard sled 105 to a PCIe switch 145 include PCIe couplings that support configurable, high-speed data links, where these PCIe links may connect motherboard 105 to hardware accelerator baseboard 115 and storage drives 120. Utilizing these capabilities, motherboard 105 may implement a variety of management and security operations for the components of chassis 100. Motherboard 105 may also include various I/O controllers that may support various I/O ports, such as USB ports that may be used to support keyboard and mouse inputs and/or video display capabilities. Such I/O controllers may be utilized to support various KVM (Keyboard, Video and Mouse) capabilities that provide administrators with the ability to interface with the chassis 100. Motherboard 105 may support various additional functions for use of resources of chassis 100, such as for the use of computational resources provided by hardware accelerator baseboard 115. In some scenarios, motherboard 105 may implement tools for managing various other resources available via chassis 100, such as power outputs of power supply unit 135, the network bandwidth provided by network controller 140 and/or PCIe switch 145, and the airflow cooling provided by cooling fans 130.

As illustrated, motherboard 105 includes a remote access controller (RAC) 110. As described in additional detail with regard to FIG. 2, remote access controller 110 provides capabilities for remote monitoring and management of the components installed in chassis 100. In support of these monitoring and management functions, remote access controllers 110 may utilize both in-band and sideband (i.e., out-of-band) 110a communications with various components of chassis 100. Remote access controllers 110 may collect various types of sensor data, such as collecting temperature sensor readings that are used in support of airflow cooling of the chassis 100 and of the motherboard 105. In addition, remote access controller 110 may implement various monitoring and administrative functions related to motherboard 105 that utilize sideband bus connections with various internal components of the motherboard 105.

Chassis 100 also includes a replaceable hardware accelerator baseboard 115 that includes one or more processing cores that may be used for delegating a variety of processing tasks, where such delegation may be through programs operating on motherboard 105, or via remote systems that interface with the hardware accelerator baseboard 115 via connections supported by network controller 140. In some embodiments, the processing cores may include multiple GPUs (Graphics Processing Units) 155a-n that may be configured for use in high-performance computing applications. In some embodiments, hardware accelerator baseboard 115 may include one or more accelerator cards, where each accelerator card may itself include one or more accelerator cores. Accordingly, GPUs 155a-n may each be GPU baseboard cards that include multiple GPU cores. In some embodiments, some or all of the accelerator cores available in a hardware accelerator baseboard 115 may be programmable processing cores that can be configured for offloading specific computational functions to the hardware accelerator baseboard 115.

Hardware accelerator baseboard 115 may be configured for general-purpose computing or may be optimized for specific computing tasks, such as for implementing machine learning or other artificial intelligence systems. In various embodiments, hardware accelerator sled baseboard provides high-performance, computational processing resources that may be used to support a variety of e-commerce, multimedia, entertainment, business and scientific computing applications. Accordingly, hardware accelerator baseboard 115 may be typically configured with hardware and software that provide leading-edge computational capabilities. Accordingly, services provided using such computing capabilities are typically provided as high-availability systems that operate with minimum downtime. As such, embodiments support efficient administration of chassis 100 and in particular support efficient replacement of hardware accelerators installed in chassis 100, as described in additional detail below As illustrated, chassis 100 also includes one or more storage drives 120 that may be attached to chassis and coupled to connectors supported by components of chassis 100, such as PCIe switch 145. For instance, storage drives 120 may include multiple solid-state drives (SSDs) 175a-n that are accessed by components of chassis 100 via PCIe switch 145, thus providing low-latency and high-bandwidth access to the SSDs. In addition to the data storage capabilities provided by storage drives 120, chassis 100 may provide access to other storage resources that may be installed as components of chassis 100 and/or may be installed elsewhere within a rack housing the chassis 100, such as within a storage blade to which chassis 100 is coupled. In certain scenarios, such storage resources may be accessed via a SAS expander that is implemented by the motherboard sled 105. The SAS expander may support connections to a number of JBOD (Just a Bunch Of Disks) storage drives 120 that may be configured and managed individually and without implementing data redundancy across the various drives. The additional storage resources may also be at various other locations within a datacenter in which chassis 100 is installed.

As described, the chassis 100 of FIG. 1 includes a network controller 140 that provides network access to the motherboard 105 and hardware accelerator baseboard 115 installed within the chassis. Network controller 140 may include various switches, adapters, controllers and couplings used to connect chassis 100 to a network, either directly or via additional networking components and connections provided via a rack in which chassis 100 is installed, such as by a network switch installed in the chassis. In some embodiments, network controller 100 may be integrated component of motherboard 105.

Chassis 100 also includes a power supply unit 135 that provides the components of the chassis with various levels of DC power from an AC power source or from power delivered via a power system provided by a rack within which chassis 100 may be installed. In certain embodiments, power supply unit 135 may be implemented within one or more sleds that provide chassis 100 with redundant, hot-swappable power supply units. As described in additional detail below, power supply unit 135 may be a sled that installed within a 1 RU bay of chassis 100.

FIG. 2 illustrates an example of an IHS 200, according to some embodiments, configured for installation in a high-density chassis that supports interchangeable hardware accelerator baseboards. It should be appreciated that although the embodiments described herein may describe an IHS that is a set of components that may be deployed within the bays of a chassis, a variety of other types of IHSs may be implemented according to the embodiments described herein. In the illustrative embodiment of FIG. 2, IHS 200 may be a computing component, such as motherboard 105 of FIG. 1. As described in additional detail with regard to FIG. 3, embodiments of IHS 200 may include a motherboard installed within one bay of a chassis 100 and an interchangeable hardware accelerator baseboard installed within another bay the chassis 100. Once installed in the chassis and coupled to each other, the motherboard, hardware accelerator baseboard, and the other described electrical components installed in chassis 100 may be considered an IHS 200.

IHS 200 may utilize one or more system processors 205, that may be referred to as CPUs (central processing units), that are components of a motherboard 105. In some embodiments, CPUs 205 may each include a plurality of processing cores that may be separately assigned computing tasks. Each of the CPUs 205 may be individually designated as a main processor and as a co-processor, where such designations may be based on delegation of specific types of computational tasks to a CPU 205. In some embodiments, CPUs 205 may each include an integrated memory controller that may be implemented directly within the circuitry of each CPU 205. In some embodiments, a memory controller may be a separate integrated circuit located on the same die as the CPU 205. Each memory controller may be configured to manage the transfer of data to and from a system memory 210 of the IHS, in some cases using a high-speed memory interface. The system memory 210 is coupled to CPUs 205 via one or more memory buses that provide the CPUs 205 with high-speed memory used in the execution of computer program instructions by the CPUs 205. Accordingly, system memory 210 may include memory components, such as static RAM (SRAM), dynamic RAM (DRAM), NAND Flash memory, suitable for supporting high-speed memory operations by the CPUs 205. In certain embodiments, system memory 210 may combine persistent non-volatile memory and volatile memory.

In certain embodiments, the system memory 210 may be comprised of multiple removable memory modules. The system memory 210 of the illustrated embodiment includes removable memory modules 210a-n. Each of the removable memory modules 210a-n may correspond to a printed circuit board memory socket that receives a removable memory module 210a-n, such as a DIMM (Dual In-line Memory Module), that can be coupled to the socket and then decoupled from the socket as needed, such as to upgrade memory capabilities or to replace faulty memory modules. Other embodiments of IHS system memory 210 may be configured with memory socket interfaces that correspond to different types of removable memory module form factors, such as a Dual In-line Package (DIP) memory, a Single In-line Pin Package (SIPP) memory, a Single In-line Memory Module (SIMM), and/or a Ball Grid Array (BGA) memory.

IHS 200 may utilize a chipset that may be implemented by integrated circuits that are connected to each CPU 205. All or portions of the chipset may be implemented directly within the integrated circuitry of an individual CPU 205. The chipset may provide the CPU 205 with access to a variety of resources accessible via one or more in-band buses 205a. IHS 200 may also include one or more I/O ports that may be used to couple the IHS 200 directly to other IHSs, storage resources, diagnostic tools, and/or other peripheral components. A variety of additional components may be coupled to CPUs 205 via a variety of busses. For instance, CPUs 205 may also be coupled to a power management unit 220 that may interface with a power system of the chassis 100 in which IHS 200 may be installed. CPUs 205 may collect information from one or more sensors 225 via a management bus.

In certain embodiments, IHS 200 may operate using a BIOS (Basic Input/Output System) that may be stored in a non-volatile memory accessible by the CPUs 205. The BIOS may provide an abstraction layer by which the operating system of the IHS 200 interfaces with hardware components of the IHS. Upon powering or restarting IHS 200, CPUs 205 may utilize BIOS instructions to initialize and test hardware components coupled to the IHS, including both components permanently installed as components of the motherboard of IHS 200 and removable components installed within various expansion slots supported by the IHS 200. The BIOS instructions may also load an operating system for execution by CPUs 205. In certain embodiments, IHS 200 may utilize Unified Extensible Firmware Interface (UEFI) in addition to or instead of a BIOS. In certain embodiments, the functions provided by a BIOS may be implemented, in full or in part, by the remote access controller 230.

In some embodiments, IHS 200 may include a TPM (Trusted Platform Module) that may include various registers, such as platform configuration registers, and a secure storage, such as an NVRAM (Non-Volatile Random-Access Memory). The TPM may also include a cryptographic processor that supports various cryptographic capabilities. In IHS embodiments that include a TPM, a pre-boot process implemented by the TPM may utilize its cryptographic capabilities to calculate hash values that are based on software and/or firmware instructions utilized by certain core components of IHS, such as the BIOS and boot loader of IHS 200. These calculated hash values may then be compared against reference hash values that were previously stored in a secure non-volatile memory of the IHS, such as during factory provisioning of IHS 200. In this manner, a TPM may establish a root of trust that includes core components of IHS 200 that are validated as operating using instructions that originate from a trusted source.

As illustrated, CPUs 205 may be coupled to a network controller 240, such as provided by a Network Interface Controller (NIC) card that provides IHS 200 with communications via one or more external networks, such as the Internet, a LAN, or a WAN. In some embodiments, network controller 240 may be a replaceable expansion card or adapter that is coupled to a connector (e.g., connection of a motherboard, backplane, midplane, etc.) of IHS 200. In some embodiments, network controller 240 may be support network operations by CPUs 205 through a PCIe coupling accessible by the chipsets of CPUs 205. In some embodiments, network controller 240 may be a component of a motherboard and may support high-bandwidth PCIe network operations by hardware accelerator baseboards installed within the chassis.

As indicated in FIG. 2, in some embodiments, CPUs 205 may be coupled to a PCIe card 255 that includes two PCIe switches 265a-b that operate as I/O controllers for PCIe communications, such as TLPs (Transaction Layer Packets), that are transmitted between the CPUs 205 and PCIe devices and systems coupled to IHS 200. In some embodiments, PCIe switches 265a-b may be connected to the IHS via a removeable card 255 that couples to a PCIe connector of the IHS. As described in additional detail below, embodiments may locate this PCIe card 255 in a front compartment of a processing sled, such as IHS 200 installed in chassis 100. Whereas the illustrated embodiment of FIG. 2 includes two CPUs 205 and two PCIe switches 265a-b, different embodiments may operate using different numbers of CPUs and PCIe switches. In addition to serving as I/O controllers that route PCIe traffic, PCIe switches 265a-b include switching logic that can be used to expand the number of PCIe connections that are supported by CPUs 205. PCIe switches 265a-b may multiply the number of PCIe lanes available to CPUs 205, thus allowing more PCIe devices to be connected to CPUs 205, and for the available PCIe bandwidth to be allocated with greater granularity.

As illustrated, PCIe switch 265a is coupled via PCIe connections to one or more GPUs (Graphics Processing Units) cores 260a that may be a connected to the IHS via a removeable GPU baseboard 260 that is coupled to PCIe connectors of the IHS. As described in additional detail below, embodiments support use of interchangeable GPU baseboards 260, where each of the interchangeable GPU baseboards is coupled to one or more of the PCIe switches 265a-b, and where each GPU baseboard 260 may include one or more GPU cores 260a. As described in additional detail below, an interchangeable GPU baseboard 260 is installed as a component of IHS 200 with an accelerator baseboard compartment within a 1 RU bay of the chassis in which IHS 200 is installed.

Each of the GPU cores 260a may be a programmable processing core and/or hardware accelerator that can be configured for offloading certain functions from CPUs 205, or for other specialized computations. For instance, PCIe switches 265a-b may transfer instructions and data for generating video images between one or more GPU cores 260a and CPUs 205. In processing this graphics data, GPU cores 260a may include hardware-accelerated processing cores that are optimized for performing streaming calculation of vector data, matrix data and/or other graphics data, thus supporting the rendering of graphics for display on devices coupled either directly or indirectly to IHS 200.

Rather than being used for rendering graphics data for display, GPU cores 260a may instead be used in hardware-accelerated processing of graphics data for other purposes, such as in support of artificial intelligence and machine learning systems. For instance, GPU cores 260a may be used in processing graphical inputs from video and/or camera feeds being utilized in support of machine vision systems. In some instances, GPU cores 260a may process streaming video data in support of on-the-fly machine vision evaluation of live captured video, where captured video data and data resulting from the processing of the video data by the GPU cores 260a may be stored by DPUs 250a-b to SSD storage drives 235a-b via PCIe lanes implemented by PCIe switches 265a-b. In other instances, GPU cores 260a may be utilized in offline processing of video data, such as for training of machine learning systems. In such instances, the video data may be retrieved by DPUs 250a-b from SSD storage drives 235a-b and transmitted to GPU cores 260a for processing, also via PCIe lanes implemented by PCIe switches 265a-b. Embodiments may additionally or alternatively used in the offloading and acceleration of various types of computational workloads other than in the processing of video data, such as signal processing algorithms used in processing of speech data.

As illustrated, PCIe switch 265a is coupled via PCIe connections to a DPU 250a that may be a connected to the IHS via an interchangeable DPU baseboard that couples to a PCIe connector of the IHS, in the same manner as the described GPU baseboard. Also as illustrated, rather than utilize a PCIe switch, DPU 250b is coupled via a PCIe connection directly to CPUs 205. Each of the DPUs 250a-b includes a programmable processor that can be configured for offloading functions from CPUs 205. In some embodiments, DPUs 250a-b may be programmed to process offloaded computations, thus sparing CPUs 205 from a significant number of interrupts required to support such algorithms and gaining efficiency through the use of specialized implementations of these offloaded PCB design computations that can be achieved using the programmable logic of the DPUs 250a-b.

In some embodiments, DPUs 250a-b may include a plurality of programmable processing cores and/or hardware accelerators, that may be used to implement functions used to support devices coupled to the IHS 200. In the illustrated embodiment, DPUs 250a-b implement functions used to support storage drives 235a-b, such as SSDs (solid-state drives). For instance, DPUs 250a-b may implement processing of PCIe communications with SSD storage drives 235a-b that support NVMe protocols that support the use of high-bandwidth PCIe connections with SSDs. In other embodiments, DPUs 250a-b may implement operations in support of other types of devices and may similarly support high-bandwidth PCIe connections with these devices. For instance, in various embodiments, DPUs 250a-b may support high-bandwidth connections, such as PCIe connections, with networking devices in implementing functions of a network switch, compression and codec functions, virtualization operations or cryptographic functions. In the same manner as GPU cards 260, in embodiments, each of the baseboards on which DPUs 250a-b are mounted may be installed and interchanged within a 1 RU accelerator baseboard compartment of a chassis 100.

As described, IHS 200 may include a remote access controller 230 that supports remote management of IHS 200 and of various internal components of IHS 200. In certain embodiments, remote access controller 230 may operate from a different power plane from the CPUs 205 and from other components of IHS 200, thus allowing the remote access controller 230 to operate, and management tasks to proceed, while the processing cores of IHS 200 are powered off. As described, various functions provided by the BIOS, including launching the operating system of the IHS 200, may be implemented by the remote access controller 230. In some embodiments, the remote access controller 230 may perform various functions to verify the integrity of the IHS 200 and its hardware components prior to initialization of the operating system of IHS 200 (i.e., in a bare-metal state).

Remote access controller 230 may include a service processor, or specialized microcontroller, that operates management software that provides remote monitoring and administration of IHS 200. Remote access controller 230 may be installed on the motherboard, backplane, midplane, etc. of IHS 200, or may be coupled to IHS 200 via an expansion slot connector provided the IHS. In support of remote monitoring functions, remote access controller 230 may include a dedicated network adapter that may support management connections by remote access controller 230 using wired and/or wireless network technologies. As a non-limiting example of a remote access controller, the integrated Dell Remote Access Controller (iDRAC) from Dell® is embedded within Dell PowerEdge™ servers and provides functionality that helps information technology (IT) administrators deploy, update, monitor, and maintain servers remotely.

In some embodiments, remote access controller 230 may support monitoring and administration of various managed devices of an IHS via a sideband bus interface 230a. For instance, messages utilized in device management may be transmitted using I2C sideband bus 230a connections that may be established with each of the managed devices. These managed devices of IHS 200, such as specialized hardware, network controller(s) 240, DPUs 250a-b, GPUs 260, and storage drives 235a-b, may be connected to the CPUs 205 via in-line buses, such as the described PCIe switch fabric, that is separate from the I2C sideband bus 230a connections used by the remote access controller 230 for device management. In some embodiments, remote access controller 230 may be a component of a motherboard of IHS 200 and may utilize sideband bus 230a in identifying characteristics of interchangeable hardware accelerator baseboards that have been installed in the accelerator baseboard compartment of a chassis. As described, interchangeable hardware accelerator baseboards, such as GPU baseboards 260 and/or DPU baseboards, may be added and removed from a chassis. In support of this capability, remote access controller 230 may be configured to interface with and identify the interchangeable hardware accelerator baseboards that are installed within the accelerator baseboard compartment of a chassis. Based on this collected information, remote access controller 230 may adjust the parameters of cooling system 215 utilized by IHS 200. In some embodiments, remote access controller 230 may utilize sideband management connections in identifying the managed GPU baseboard 260 or DPUs 250a-b baseboards installed in the accelerator baseboard compartment of a chassis.

As illustrated in FIG. 2, PCIe switches 265a-b may support PCIe connections in addition to those utilized by GPUs 260 and DPUs 250a-b, where these connections may include PCIe links of one or more lanes. For instance, PCIe connectors 245a-b supported by printed circuit board of IHS 200 may allow various other systems and devices to be coupled to IHS. Through couplings to PCIe connectors 245a-b, a variety of data storage devices, graphics processors and network interface cards may be coupled to IHS 200.

In various embodiments, an IHS 200 does not include each of the components shown in FIG. 2. In various embodiments, an IHS 200 may include various additional components in addition to those that are shown in FIG. 2. Furthermore, some components that are represented as separate components in FIG. 2 may in certain embodiments instead be integrated with other components. For example, in certain embodiments, all or a portion of the functionality provided by the illustrated components may instead be provided by components integrated into the one or more processor(s) 205 as a systems-on-a-chip.

Figure 3:
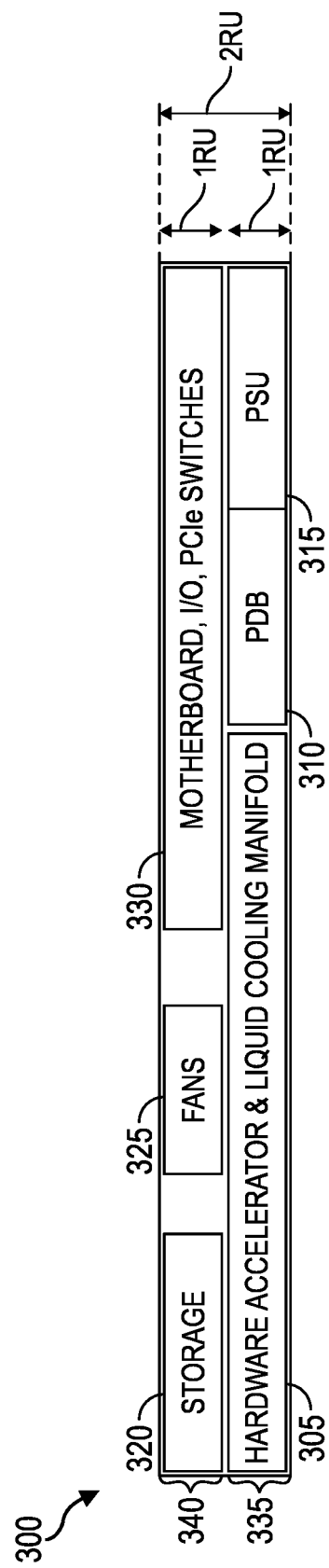
FIG. 3 is a cutaway sideview illustration of internal compartments of a chassis, according to embodiments, that supports interchangeable accelerator baseboards.

FIG. 3 is a cutaway sideview illustration of internal compartments of a chassis 300, according to embodiments, that supports interchangeable accelerator baseboards. In some instances, components installed in the chassis 300 may be serviced, added or replaced by a data center administrator without removing the chassis from within the rack in which the chassis is installed. In other instances, the chassis 300 may be removed from the rack in order to access certain internal components of the chassis. For instance, an administrator may remove chassis 300 from service in order to modify the hardware-accelerated processing capabilities of the chassis, such as by changing the GPU baseboard installed within a accelerator baseboard compartment 305 of the chassis.

As indicated in FIG. 3, the chassis 300 is physically divided into two separate layers. A first layer is a control layer 340 that includes a motherboard and I/O components 330 that provide computing resources used in the command and control of chassis 300. The second layer is a processing layer 335 that includes a hardware accelerator baseboard compartment 305 that is located in a front compartment of the processing layer. In the illustrated embodiment, the control layer 340 is in the top bay of chassis 300 and processing layer 335 is the bottom bay of chassis 300. In other embodiments, the order of these two layers within chassis 300 may be reversed such that processing layer 335 is in the top bay of chassis 300 and control layer 340 is in the bottom bay of chassis 300.

Regardless of the ordering of the layers of chassis 300, as indicated in FIG. 3, the processing layer 335 has a height of 1 RU and the control layer 340 also has a height of 1 RU, such that the height of chassis 300 is 2 RU. At 2 RU in height, embodiments support high-density configurations of computing resources within a rack of a data center. Use of high-performance computing components, such as hardware accelerators, generates significant amounts of heat. The processing loads that are placed on hardware accelerators can be prolonged as a result of the accelerators being efficiently delegated computationally intensive processing tasks, such as in support of machine learning and other artificial intelligence systems. In existing systems, cooling requirements for hardware accelerators have been addressed through the addition of heatsinks and/or additional cooling fans. The volume required for the installation and operation of such heatsinks and cooling fans results in chassis heights of 4 RU, or greater, even when the hardware accelerator baseboards are installed horizontally.

The inventors have recognized that the cooling requirements for hardware accelerators that are intended to provide high-performance and high-availability computing are preferably addressed using liquid cooling systems. Through the use of a 1 RU liquid cooling manifold, embodiment support the use of interchangeable hardware accelerators within a 1 RU bay of a 2 RU chassis, thus promoting increased density within racks of a data center, and providing a single chassis that can be used with a variety of hardware accelerator baseboards. As described below, embodiments provide capabilities for utilizing chassis 300 with various different types and models of hardware accelerator baseboards, despite the significant variations in the hardware interfaces used by the baseboards.

In supporting high-density configurations that fit within 2 RUs and that support interchangeable hardware accelerator baseboards, the 1 RU control layer 340 of chassis 300 includes the management, control, data storage and I/O capabilities of the chassis. In particular, the control layer 340 includes a motherboard compartment 330 that includes a motherboard and the I/O components of the chassis 300, where these I/O components include a network controller and a PCIe switch, such as described with regard to the IHS 200 of FIG. 2. In some embodiments, the I/O components included in the motherboard compartment 330 are utilized by the hardware accelerator baseboard that is installed in the accelerator baseboard compartment 305. In some embodiments, hardware accelerator baseboards may include integrated I/O capabilities.

Also include in the control layer 340 are one or more data storage devices 320 that may provide storage capabilities for use by the motherboard and for the hardware accelerator baseboards. As illustrated in FIG. 3, the motherboard compartment 330 is located at the rear of the control layer of chassis 300 and the data storage devices 320 are located at the front of the control layer. As described in additional detail below, while separated by a 1 RU bank of cooling fans 325, embodiments provide sufficient cooling for the storage devices 320 and the motherboard and I/O devices in the motherboard compartment 330, and to the power delivery components installed in the processing layer 335, as long as these components are installed in the chassis 300 in the described configuration.

As illustrated in FIG. 3, the processing layer 335 of chassis 300 includes the accelerator baseboard compartment 305 at the front of that layer and power supply compartment 315 and power delivery compartment 310 at the rear of the processing layer. In some embodiments, the power delivery compartment may include one or more power supply units that serve as power sources for all of the components of chassis 300. In some embodiments, these power supply units may be replaceable components that can be inserted and removed from the power supply compartment 310 by a data center administrator via the rear of chassis 300. The power supply units may be coupled to a power distribution board 310 that is installed between the power supply units and the accelerator baseboard compartment 305. The power distribution board 310 receives power inputs from the power supply units 310 and provides regulated power supplies to the components of the chassis, including the components of the motherboard compartment 330 in the control layer 340, as well as the hardware accelerator baseboard that is installed in the accelerator baseboard compartment 305.

As described, processing layer 335 includes an accelerator baseboard compartment 305 that supports installation of interchangeable hardware accelerator baseboards, such as the GPU baseboards and DPU baseboards described with regard to the IHS 200 of FIG. 2. In some embodiments, the hardware accelerator baseboards may be constructed from a PCB board with connectors, such as PCIe connectors, that are used to couple the respective baseboards to the I/O and/or CPU of the motherboard compartment 330. The cores of the hardware accelerator baseboard installed in the accelerator baseboard compartment 305 may be tasked by processes operating on a CPU of motherboard 330, or by processes operating on another IHS, that may or may not be within the same data center as chassis 300. In some instances, the hardware accelerators of the interchangeable hardware accelerator baseboards may be utilized in machine learning and other artificial intelligence systems that are configured to distribute computing operations to available computing resources. In some instances, the interchangeable hardware accelerator baseboards may each be configured especially for specific computing tasks, such as through the customization of programmable processors of the hardware accelerator baseboards for specific calculations, Through the configuration of chassis components illustrated in FIG. 3, inventors have recognized that the cooling requirements for chassis 300 can be met using a 1 RU bank of cooling fans 325 that are located in their illustrated position in the control layer 340 between the storage drives 320 and the motherboard compartment 330 of the chassis 300, as long as liquid cooling is utilized to provide cooling for the accelerator baseboard compartment 335. In this position, the bank of fans 325 draws ambient air from gaps between the storage drives 320 in the front of the chassis and also forces heated air out the rear of the chassis 300 and away from the components of the motherboard compartment 330, and also away from the power delivery 310 and power supply 315 modules at the rear of the processing layer 335. Using the cooling configuration provided by embodiments, interchangeable hardware accelerators are supported within a 2 RU chassis 300, thus promoting high-density configurations of resources within the racks of a data center.

Figure 4A:
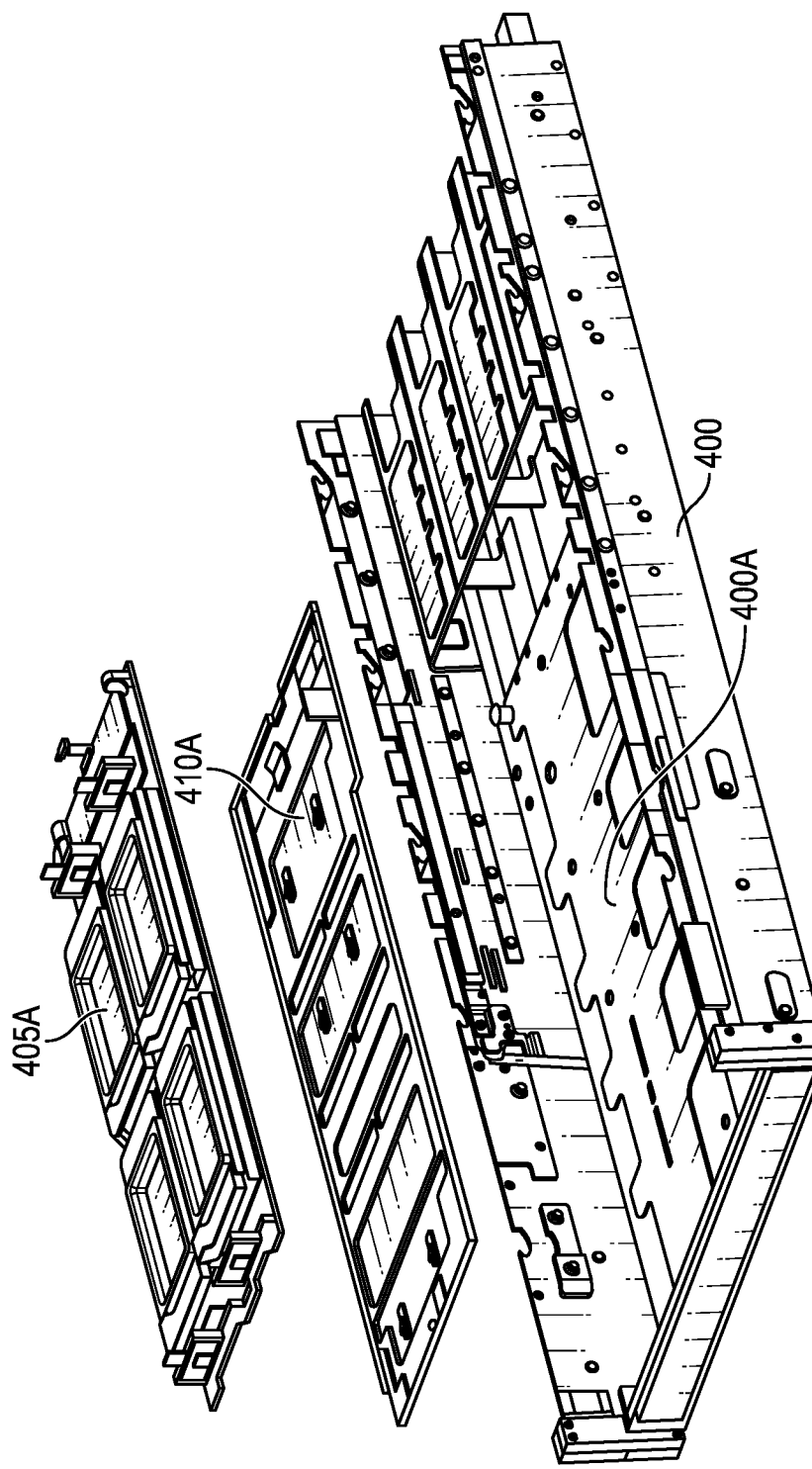
FIG. 4A is an illustration of the installation of an accelerator baseboard in a chassis, according to embodiments, that supports interchangeable accelerator baseboards.
Figure 4B:
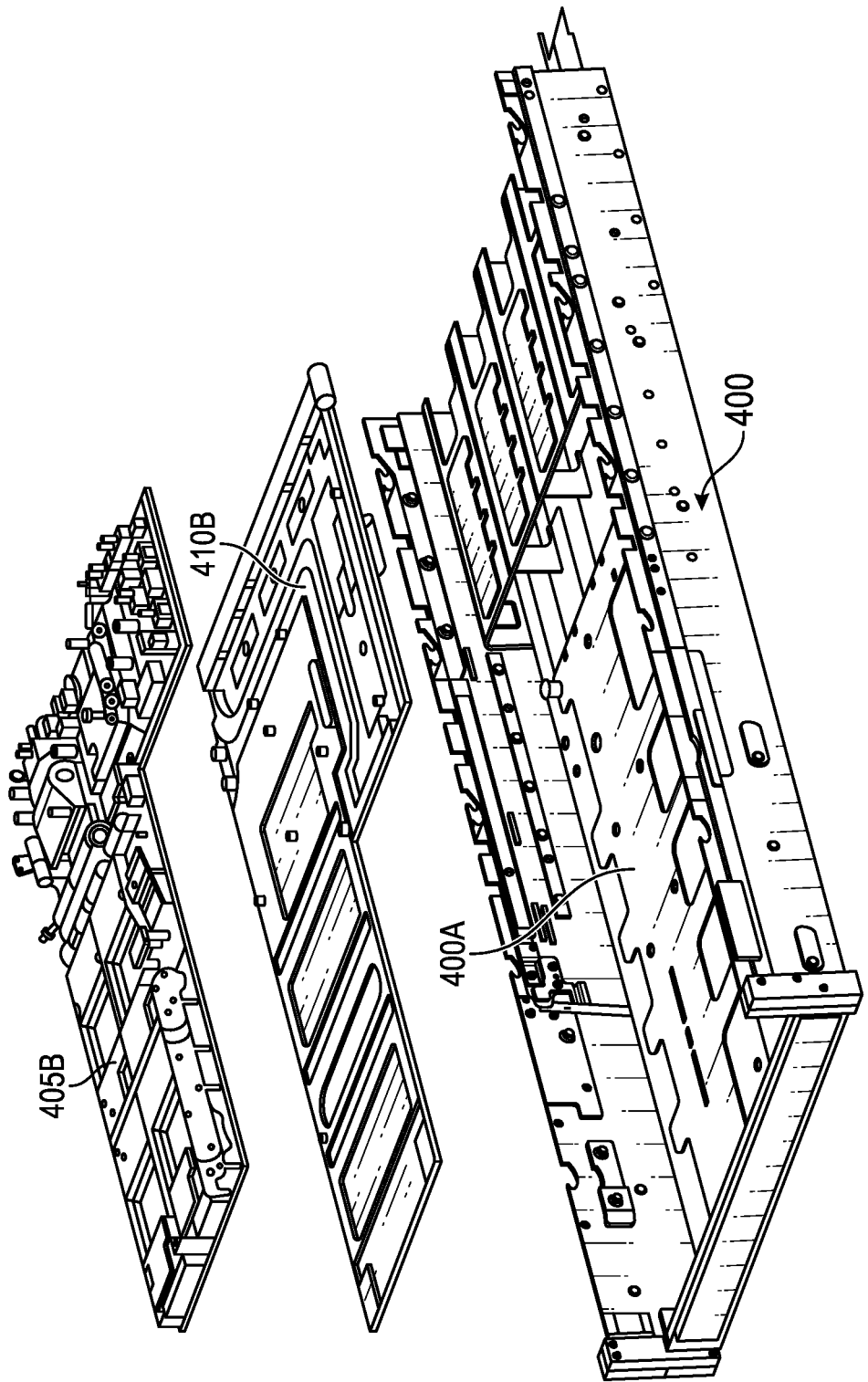
FIG. 4B is an illustration of the installation of an additional accelerator baseboard in a chassis, according to embodiments, that supports interchangeable accelerator baseboards.
Figure 4C:
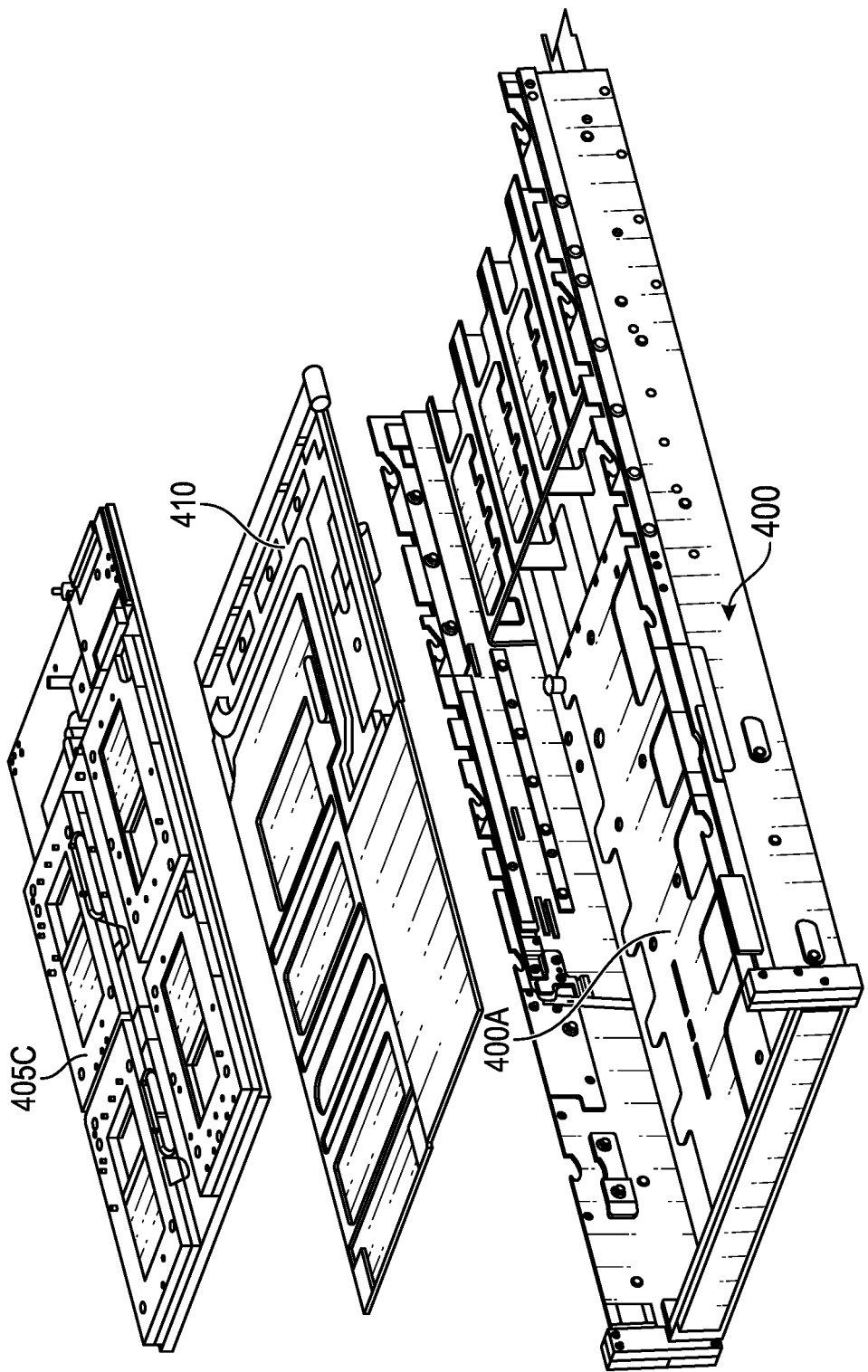
FIG. 4C is an illustration of the installation of an additional accelerator baseboard in a chassis, according to embodiments, that supports interchangeable accelerator baseboards.

In this optimal arrangement of components within chassis 300, the accelerator baseboard compartment 305 is located within a front compartment of the processing layer 335 of the chassis. However, as described, processing capabilities of a chassis 300 may be modified for various reasons, such as to customize the computational capabilities of chassis 300 to a specific set of computational tasks, or such as in response to a change in ownership or leasing of chassis 300. Accordingly, datacenter administrators require the ability to occasionally access the accelerator baseboard compartment in order to swap the hardware accelerator baseboard that is installed in that compartment. As illustrated in FIGS. 4A-C, embodiments support the ability for administrators to add and remove interchangeable hardware accelerator baseboards 405a-c from within the accelerator baseboard compartment 400a of chassis 400.

FIGS. 4A, 4B and 4C are illustrations depicting the installation of interchangeable accelerator baseboards within a chassis 400, according to embodiments. In each of FIGS. 4A, 4B and 4C, different hardware accelerator baseboards 405a-c are being installed within the accelerator baseboard compartment 400a of the chassis 400. As described in additional detail below, improvements to chassis 400 that support interchangeable use of hardware accelerator baseboards 405a-c include structures on the base of the accelerator baseboard compartment 400a, where the base is the bottom, inner surface of chassis 400. Embodiments provide a chassis 400 that supports interchangeable use of hardware accelerator baseboards 405a-c, despite the varying hardware interfaces and physical sizes of the various hardware accelerator baseboards that may be used in a data center.

In FIGS. 4A, 4B and 4C, three representative hardware accelerator baseboards are illustrated, each having different geometries and utilizing different hardware interfaces. Even if common connectors, such as PCIe connectors, are typically utilized by hardware accelerator baseboards, the connectors are not identically located. A chassis 400 according to embodiments provides support for different baseboard geometries, as well as providing the ability to support the different hardware interfaces that are found in hardware accelerator baseboards, such as the GPU baseboards and DPU baseboards described with regard to the IHS of FIG. 2.

As indicated in each of FIGS. 4A, 4B and 4C, each supported hardware accelerator baseboard 405a-c is installed on top of a baseboard tray 410a-c, where the tray may be constructed from sheet metal and provides EMI shielding and serves as a drip pan that supports use of liquid cooling systems. As reflected in each of FIGS. 4A, 4B and 4C, the geometry of each of the hardware accelerator baseboards 405a-c differs with respect to the length, width and/or thickness of the baseboards. At least some of these hardware accelerator baseboards 405a-c may be designed to be installed in an upright, vertical orientation. In this upright orientation, hardware accelerator baseboards 405a-c require at least 4 RU, and in some cases 6 RU, of vertical rack space. Such configurations allow for multiple hardware accelerator baseboards to be installed side-by-side within a 4 RU or 6 RU compartment. However, in many scenarios, only a single hardware accelerator baseboard is required to support a particular customer or computing agreement. In light of rack space within a data center being very limited, upright installation of a single hardware accelerator baseboard within an otherwise empty 4 RU or 6 RU compartment would result in a significantly underutilized space within a rack. Accordingly, embodiments support horizontal installation of hardware accelerator baseboards 405a-c, while providing a chassis 400 that can accommodate a variety of hardware accelerator baseboards that have different physical geometries and different hardware interfaces.

In order to configure a chassis 400 for use of a hardware accelerator baseboard, a data center administrator selects the baseboard tray 410a-c that corresponds to the hardware accelerator baseboard that is being installed. The baseboard trays 410a-c have a geometry that corresponds to that of a respective hardware accelerator baseboard in that the baseboard tray 410a-c has the same shape and size as a respective hardware accelerator baseboard, with the tray having slightly larger dimensions than a corresponding baseboard. In addition to having a geometry that corresponds to a corresponding baseboard, the geometry of the baseboard tray 410a-c also corresponds the geometry of a liquid cooling manifold installed in the accelerator baseboard compartment 400a. A liquid cooling manifold includes liquid coolant couplings at fixed locations. Hoses, tubes, pipes or the like are connected to these coupling and used to transfer coolant between the baseboard and the manifold. The hardware accelerator baseboard thus also includes couplings by which the coolant hoses are connected to the baseboard. The geometry of each baseboard tray 410a-c may be selected to align the liquid coolant couplings of a baseboard with the liquid coolant couplings of the corresponding liquid cooling manifold that will be installed in the compartment. For instance, baseboard tray 410a of FIG. 4A includes a cutout along one length that corresponds to the shape and position of a particular liquid cooling manifold. In baseboard tray 410b of FIG. 4B, a much larger cutout is included along that same length of the tray, where this larger cutout corresponds to a larger size of a particular liquid cooling manifold. In the baseboard tray 410c of FIG. 4C, rather than a cutout, the tray includes a flat recessed portion on which a particular liquid cooling manifold is rested, in which case the tray is installed prior to installing the liquid cooling manifold. Once a specific baseboard has been selected, the corresponding baseboard tray 410a-c is then fastened to the base of the accelerator baseboard compartment 400a, where the alignment and fastening of the baseboard trays 410a-c is described with regard to FIGS. 5A and 5B.

Figure 5A:
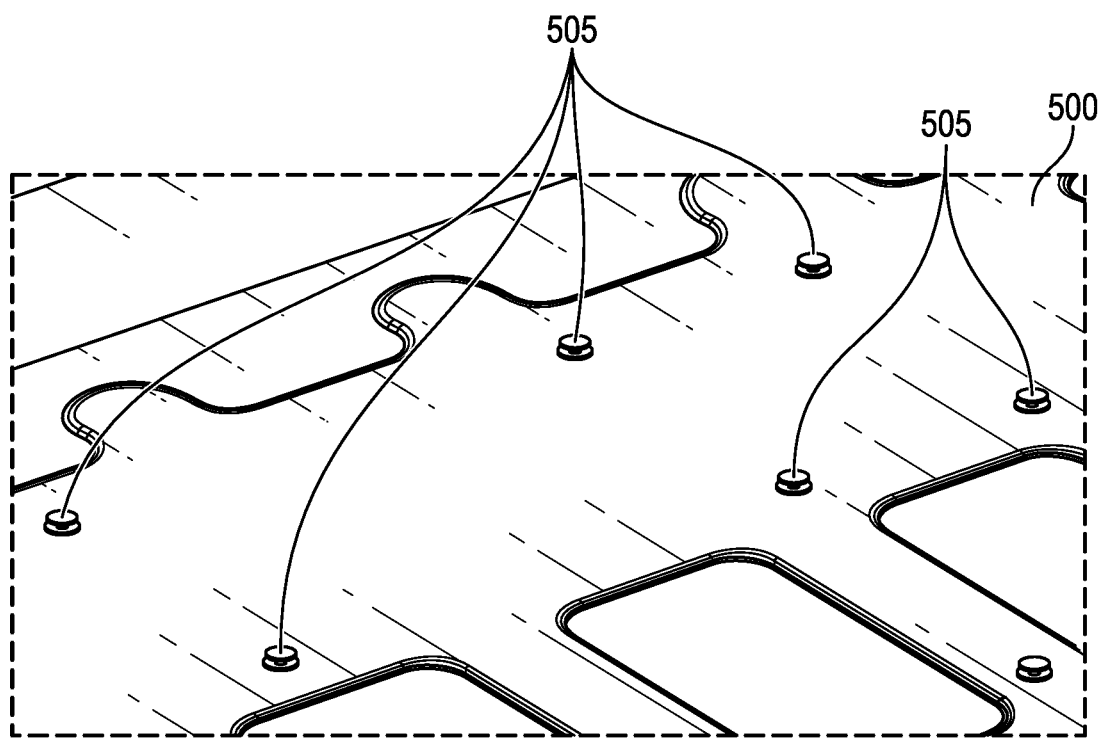
FIG. 5A is an illustration of a portion of a base of an accelerator baseboard compartment within a chassis according to embodiments.

FIG. 5A is an illustration of a portion of a base 500 of an accelerator baseboard compartment within a chassis according to embodiments. FIG. 5A illustrates a portion of the keyhole standoff structures 505 that are disbursed throughout the base 500 of the accelerator baseboard compartment. These keyhole standoffs 505 may be disbursed throughout the base 500 in a variety of different geometric patterns, such as the grid pattern of keyhole standoffs 505 illustrated in FIG. 5A. The pattern that is selected for the keyhole standoffs 505 allows the baseboard trays 410a-c to be mounted on these keyhole standoffs 505 such that each tray is aligned on the base 500 of the accelerator baseboard compartment 400 and each tray is securely attached to the base once the keyhole standoffs 505 of base 500 have been coupled with corresponding keyhole cutout structures of the baseboard tray 410a-c, as illustrated in FIG. 5B.

Figure 5B:
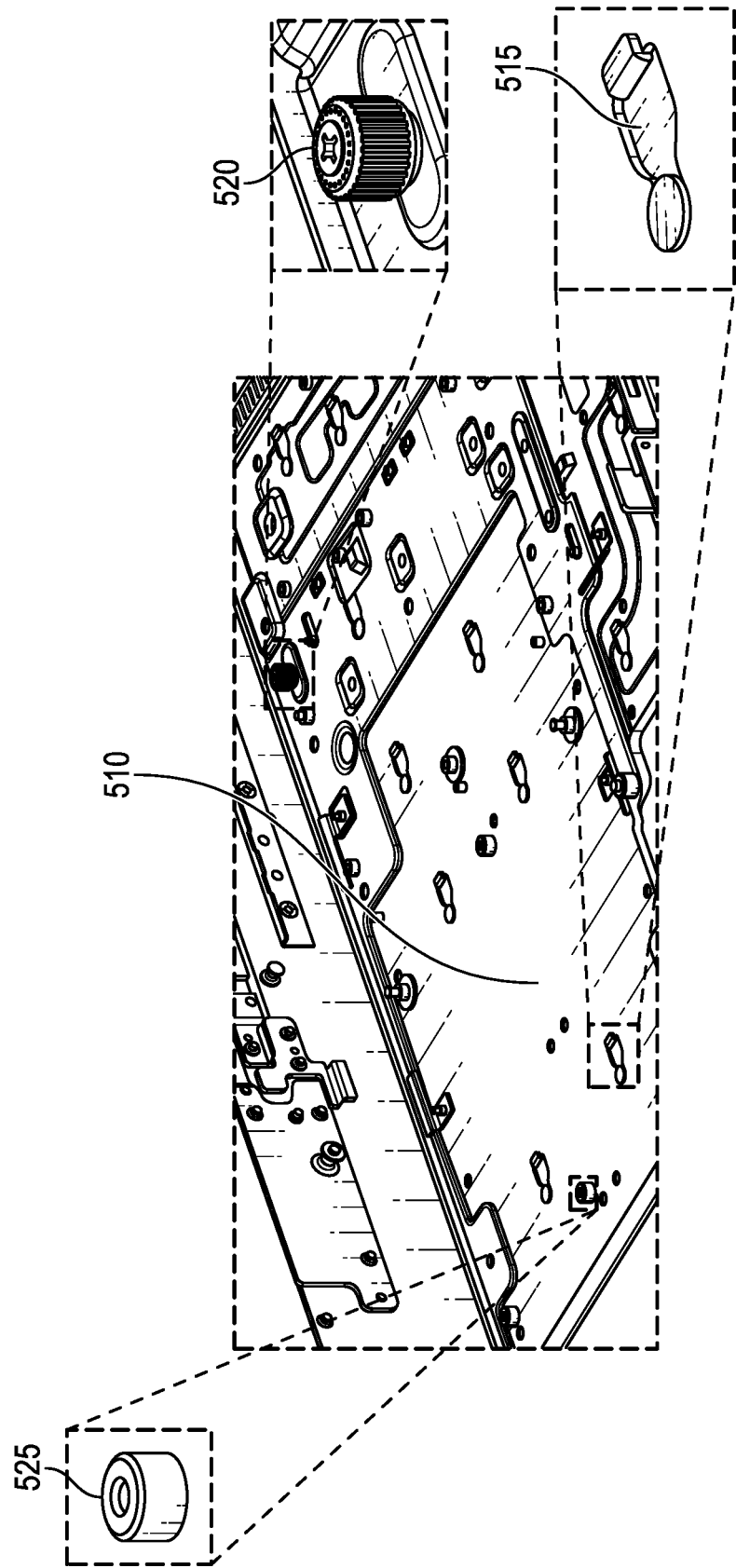
FIG. 5B is an illustration of a portion of a baseboard tray installed on a base of an accelerator baseboard compartment within a chassis according to embodiments.

FIG. 5B is an illustration of a portion of a baseboard tray installed on a base of an accelerator baseboard compartment within a chassis according to embodiments. In FIG. 5B, a baseboard tray 510 has been fastened to the keyhole standoffs 505 on the base 500 of the accelerator baseboard compartment. As illustrated in FIG. 5B, a baseboard tray 510 includes keyhole cutouts 515 that are distributed throughout the tray. In embodiments, these keyhole cutouts 515 are arranged in the baseboard tray 510 in the same geometrical pattern as the pattern in which the keyhole standoffs 505 are distributed throughout the base 500 of the accelerator baseboard compartment. For instance, if the keyhole standoffs 505 are disbursed in a grid pattern throughout the base 500, the keyhole cutouts 515 of the baseboard tray 510 are also disbursed in that same grid pattern, where the distances between neighboring cutouts 515 of a baseboard tray 510 is the same as the distances between neighboring standoffs 505 of the base 500. Configured in this manner, the chassis may receive a variety of different baseboard trays 410a-c, as long as the baseboard tray includes keyhole cutouts 515 that correspond to the keyhole standoffs 505 disbursed on the base 500 of the accelerator baseboard compartment of the chassis.

As described, hardware accelerator baseboards may have a variety of different sizes and shapes. Accordingly, the baseboard trays 410a-c of each hardware accelerator baseboard may utilize a different portion of the keyhole standoffs 505 located on the base 500 of the accelerator baseboard compartment. Larger baseboards, such as 405c, will utilize a large portion of the keyhole standoffs 505, whereas a smaller baseboard, such as 405b, will utilize a smaller portion of these keyhole standoffs 505. In this manner, the keyhole standoffs 505 disbursed on the base 500 of the accelerator baseboard compartment supports a variety of interchangeable hardware accelerator baseboards regardless of their differing sizes and shapes.

In installing a baseboard tray 510, an administrator aligns the openings of the keyhole cutouts 515 of the baseboard tray 510 with the keyhole standoffs 505 on the base 500. Once the cutouts 515 of baseboard tray 510 have been aligned on some or all of the standoffs 505 of the base 500, the administrator slides the baseboard tray 510 in parallel with the base 500 such that the recessed portion of the keyhole standoffs 505 each slide into keyhole grooves that extend from the larger opening of each of the cutouts 515 through which the head portion of the keyhole standoffs has been inserted. Accordingly, each of the keyhole standoffs 505 mounted on base 500 may be metal pins that have a protruding base, a protruding head and a recessed middle portion. Once the administrator slides the baseboard tray 510 onto the keyhole standoffs 505, the recessed middle portion of each structure receives the narrow keyhole groove extending from the opening of each of the cutouts 515 of the baseboard tray 510. In embodiments, the width of this recessed portion of the keyhole standoffs 505 is selected to correspond to the width of the keyhole grooves extending from the cutouts 515, thus allowing the baseboard tray 510 to be securely held in place once the keyhole portion of the cutouts 515 and the recessed portion of the keyhole standoffs 505 have been engaged by the administrator.

In embodiments, locating the baseboard tray 510 on the correct set of keyhole standoffs 505 and sliding the baseboard tray 510 onto these keyhole standoffs 505 serves to align holes along the perimeter of the baseboard tray 510 with threaded holes of the base 500 of the chassis. With the holes of the baseboard tray 510 aligned with the threaded holes on the base 500, these threaded holes of the base receive thumbscrews 520 that, once tightened, serve to precisely position the baseboard tray 510 within the accelerator baseboard compartment and also to securely fasten the baseboard tray 510 to the base 500.

Once precisely located and fastened using these screws, the baseboard tray 510 is ready to receive the corresponding hardware accelerator baseboard 405a-c, where this precise positioning of the baseboard tray 510 serves to position each respective tray relative to a liquid cooling manifold that is located in the accelerator baseboard compartment. As illustrated in FIG. 5, mounted on the baseboard tray 510 are baseboard standoffs 525 on which a specific hardware accelerator baseboard may be fastened, thus positioning the baseboard relative to the tray 510, and thus also relative to the liquid cooling manifold. The height of these standoffs 525 may be selected based on the size and shape of the hardware accelerator baseboard that corresponds to this particular baseboard tray 510. For instance, taller standoffs 525 may be mounted on baseboard trays for a particular hardware accelerator baseboard, such as in order to account for the size of heatsinks or other structures that are mounted on the underside of these particular hardware accelerator baseboards.

The installed location of the baseboard tray 510 on the base is determined based on the location of the keyhole cutouts 515 of the baseboard tray 510. Depending on the locations of these keyhole cutouts 515, the alignment of these keyhole cutouts 505 with the keyhole standoffs 505 on the base will result in the baseboard tray 510 being positioned at different locations within the accelerator baseboard compartment, regardless of the selected pattern in which the keyhole standoffs 505 and keyhole cutouts 515 are both arranged relative to each other. A baseboard tray 510 according to embodiments thus includes keyhole cutouts 515 that are located at positions that, once the keyhole cutouts 515 of the baseboard tray 510 have pushed into the recessed portion of the keyhole standoffs 505 mounted on the base 500, the baseboard tray 510 is alignted and positioned relative to a liquid cooling manifold that is also included inside the accelerator baseboard compartment.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. A system comprising:
    a first accelerator baseboard comprising a plurality of processing cores;
    a first baseboard tray of a geometry corresponding to a geometry of the first accelerator baseboard;
    a second accelerator baseboard comprising a plurality of processing cores;
    a second baseboard tray of a geometry corresponding to a geometry of the second accelerator baseboard;
    a 2 RU chassis comprising a 1 RU accelerator baseboard compartment, wherein a base of the accelerator baseboard compartment comprises a plurality of structures mounted on the base that receive corresponding structures of the first baseboard tray and that also receive corresponding structures of the second baseboard tray; and
    wherein installation of the first baseboard tray on the structures mounted on the base of the accelerator baseboard compartment and installation of the first accelerator baseboard on the first baseboard tray aligns the first accelerator baseboard within the accelerator baseboard compartment; and
    wherein installation of the second baseboard tray on the structures mounted on the base of the accelerator baseboard compartment and installation of the second accelerator baseboard on the second baseboard tray aligns the second accelerator baseboard within the accelerator baseboard compartment.

2. The system of claim 1, wherein the first accelerator baseboard and the second accelerator baseboard each comprises at least one of a plurality of GPUs (Graphics Processing Units) and a plurality of DPUs (Data Processing Units).

3. The system of claim 1, wherein the installation of the first baseboard tray on the structures mounted on the base of the accelerator baseboard compartment further aligns the first accelerator baseboard with a first liquid cooling manifold installed in the accelerator baseboard compartment, and wherein installation of the second baseboard tray on the structures mounted on the base of the accelerator baseboard compartment further aligns the second accelerator baseboard with a second liquid cooling manifold installed in the accelerator baseboard compartment.

4. The system of claim 3, wherein the geometry of the first baseboard tray further corresponds to an installed location of the first liquid cooling manifold in the accelerator baseboard compartment, and wherein the geometry of the second baseboard tray further corresponds to an installed location of the second liquid cooling manifold in the accelerator baseboard compartment.

5. The system of claim 1, wherein the plurality of structures mounted on the base of the accelerator baseboard compartment comprises a plurality of keyhole standoffs mounted at locations dispersed about the base of the accelerator baseboard compartment.

6. The system of claim 4, wherein each of a plurality of keyhole standoffs mounted on the base of the accelerator baseboard compartment comprise a recessed portion, and wherein the structures of the first baseboard tray and the structures of the second baseboard tray comprise keyhole cutouts that are received by the recessed portion of respective keyhole standoffs.

7. The system of claim 5, wherein each of the plurality of keyhole standoffs comprises a head portion above the recessed portion and a base portion below the recessed portion, wherein the height of the base portion elevates the installed first baseboard tray and the installed second baseboard tray above the base of the accelerator baseboard compartment.

8. The system of claim 5, wherein a width of a grooved portion of the pins corresponds to a thickness of sheet metal used to construct the first baseboard tray and the second baseboard tray.

9. The system of claim 1, wherein the plurality of structures mounted on the base of the accelerator baseboard compartment are disbursed in a first pattern, and wherein the structures of the first baseboard tray and the structures of the second baseboard tray are also arranged in the first pattern.

10. The system of claim 9, wherein the first pattern is a grid pattern.

11. The system of claim 1, wherein installation of the first baseboard tray on the structures mounted on the base of the accelerator baseboard compartment further aligns holes of the first baseboard tray with threaded holes in the base of the accelerator baseboard compartment, and wherein installation of the second baseboard tray on the structures mounted on the base of the accelerator baseboard compartment further aligns holes of the second baseboard tray with the threaded holes in the base of the accelerator baseboard compartment.

12. The system of claim 11, wherein the aligned holes of the first baseboard tray and the threaded holes in the base of the accelerator baseboard compartment receive screws used to fasten the first baseboard tray to the base and to precisely position the first baseboard tray relative to a liquid cooling manifold, and wherein the aligned holes of the second baseboard tray and the threaded holes in the base of the accelerator baseboard compartment receive screws used to fasten the second baseboard tray to the base and to precisely position the second baseboard tray relative to the liquid cooling manifold.

13. The system of claim 1, wherein the first baseboard tray and the second baseboard tray are installed horizontally within the 1 RU accelerator baseboard compartment.

14. The system of claim 1, wherein a plurality of first standoffs of a first height are mounted on the first baseboard tray and the first accelerator baseboard is fastened to the first standoffs in installing the first accelerator baseboard to the first baseboard tray, and wherein a plurality of second standoffs of a second height are mounted on the second baseboard tray and the second accelerator baseboard is fastened to the second standoffs in installing the second accelerator baseboard to the second baseboard tray.

15. The system of claim 14, wherein the first height of the first standoffs is selected to accommodate features on an underside of the first accelerator baseboard when fastened to the first standoffs.

* * * * *